United States Patent [19]
Whittaker

[11] 3,785,359
[45] Jan. 15, 1974

[54] WINDSHIELD WASH WATER HEATER
[76] Inventor: Thomas H. Whittaker, 9114 Olde Eight, Northfield, Ohio 44167
[22] Filed: Mar. 28, 1970
[21] Appl. No.: 238,850

[52] U.S. Cl. .................................................. 126/19.5
[51] Int. Cl. ................................................. F24b 1/00
[58] Field of Search ...................... 126/19.5; 237/12

[56] References Cited
UNITED STATES PATENTS
| | | | |
|---|---|---|---|
| 2,467,156 | 4/1949 | Sala | 126/19.5 X |
| 1,757,448 | 5/1960 | Cooper | 126/19.5 |
| 3,148,675 | 9/1964 | Menuto | 126/19.5 |
| 1,651,875 | 12/1927 | Ercanbrack | 165/176 |

Primary Examiner—Edward G. Favors
Attorney—Philip D. Golrick

[57] ABSTRACT

For inclusion on the line between the wash liquid supply and the discharge jets of an automotive vehicle windshield wash liquid pumping system, a liquid heater secured on the engine exhaust pipe, comprising a pipe-embracing saddle-shaped metal body with a cavity forming a liquid heating flow space provided with line connector nipples.

5 Claims, 4 Drawing Figures

PATENTED JAN 15 1974

3,785,359

WINDSHIELD WASH WATER HEATER

By common winter experience of auto drivers much on the road, especially in the more northernly regions of the United States and Canada, frosting, icing or the like of the windshield is often an annoyance and not infrequently a definite driving hazard. Thus where a vehicle has been parked out of doors, freezing rain, sleet, or wet snow which has frozen, or at time heavy frost, may be deposited which is not removable by windshield wiper action, may in fact have immobilized the blades, but in any event requiring scraping or chipping or application of chemical sprays, or a prolonged wait for the defrosters to melt or lessen the deposit, to clear at least the wiper-swept area, before the vehicle can be safely driven.

Even under some warm weather driving conditions, hot wash water becomes highly desirable. Thus road oil or grime, especially on a recently wetted road, thrown against the windshield, can be cleaned in a second or two with heated wash water, whereas with unheated wash there may be several seconds of dangerously obscured vision. Also vehicles parked under certain species of trees will accumulate a sap-like deposit which is not easily washed off by the usual auto windshield washers.

At times, even when a vehicle is being driven with the defrosters on at full heat and wipers operating, severe weather conditions may lead to some vision-obscurring icing, or there may be a small localized pad of ice or snow frozen onto a blade and spacing the rest of the blade from effective glass-wiping contact, so that vision is interfered with unless the driver stops to clean the blade. Usually under these circumstances the windshield washer system is of little help, since its wash liquid supply is itself comparatively cold and in any event would require undesirably extended use to be of any value.

To overcome such conditions, hitherto there have been under-the-hood apparatus or systems proposed to heat a suitable aqueous liquid by heat exchangers picking up heat either from the exhaust manifold or exhaust pipe, or from heated engine coolant, with the heated water then directed onto the windshield as needed.

The prior proposals have entailed various disadvantages. Some for example have by-passed or diverted exhaust gases through the heat exchanger, undesirable since interrupting the integrity of the poisonous exhaust gas conduits. Others have required connections into the engine block, the coolant hoses or inside heater hoses to furnish a heating medium to the wash water heater. Both types have had a degree of complexity in structure and/or in mounting which preferably is avoided or minimized.

By the present invention there is provided a heater for the windshield wash water which is readily clamped and secured on an exhaust pipe or manifold to pick up waste heat, and without penetration or interruption of the exhaust gas conduits, and which is simply connected into the windshield washer system. Further the heater structure itself is quite simple, maintence-free and of comparatively low cost, involving only a simple body, such as a casting, a clamping device, and only a pair of simple line connector fittings in the preferred form hereinafter described in detail.

The general object of the present invention is to provide a simple low cost rugged heat exchanger unit for heating a liquid by engine exhaust waste heat in an automotive vehicle.

Another object is to provide a simple windshield wash liquid heater readily installed in a vehicle such as an automobile.

Another object is to provide a heater furnishing heated water for cleaning a windshield of icing in conjunction with wiper action over its area in a comparatively short time after engine starting.

Other objects and advantages will appear from the following description and the drawings wherein.

Figure 1:
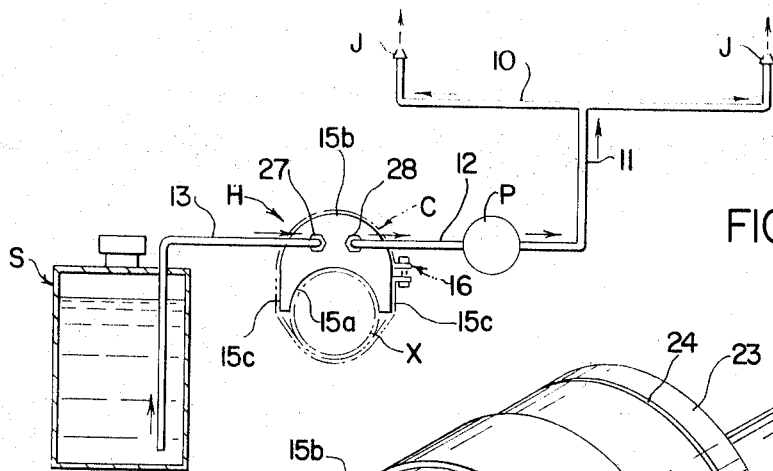
FIG. 1 is a schematic diagram of a heater installation in a windshield wiper wash water system.

In the drawings, FIG. 1 schematically represents use of a heater unit H of the invention as hereinafter described in an automotive vehicle environment, namely in a windshield washer system, wherein the washer jets J are supplied with heated water through lines 10–11 by pump P with intake connected by line 12, the heater H and heater inlet line 13 to the wash water liquid supply vessel S. The heater is held in thermally conductive contact and heat transferring proximity with the engine exhaust manifold or the exhaust pipe X to warm the wash water passing therethrough.

Figure 2:
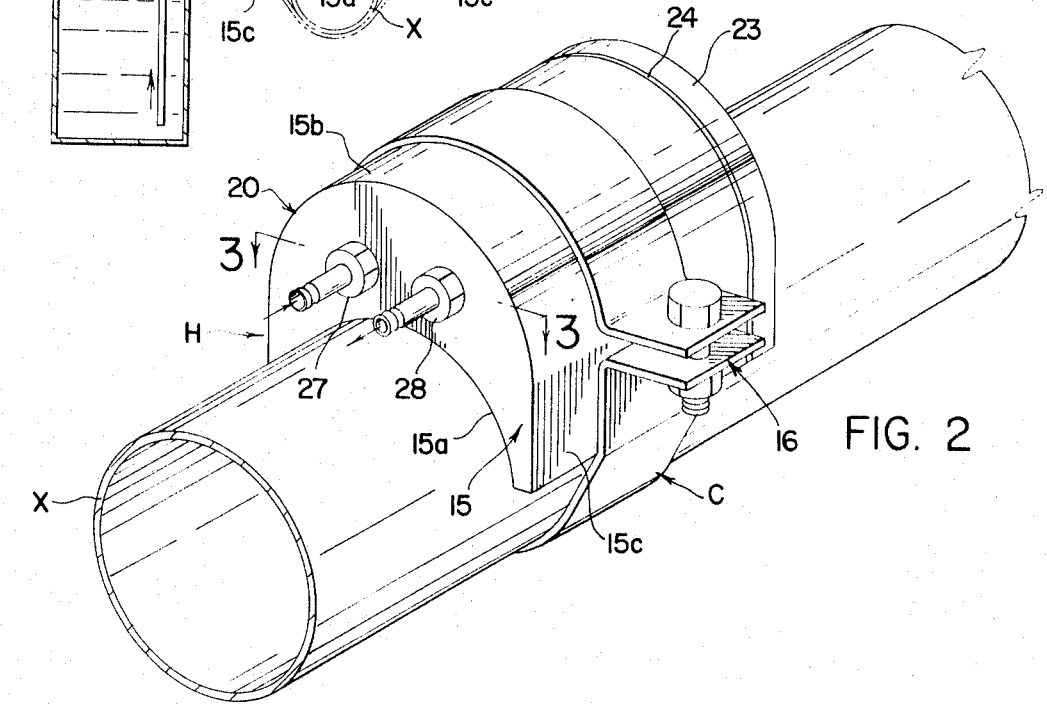
FIG. 2 is a perspective view of a heat exchanger unit mounted on a fragmentarily shown engine exhaust pipe.

The heater unit H, in general form of uniform section along its length and symmetrical about a longitudinal center plane, has a longitudinally straight transversely concave bottom recess 15a and a transversely arcuate top 15b merging into straight nearly parallel outer side surfaces defining narrow bottomed side skirts 15c; providing top and side surfaces well adapted for band clamping on the cylindrical pipe exterior as shown in FIG. 2, by even a simple bolt-tightened clamp strap C or any other suitable banding clamp, with the opposed band ends at 16 bolted on or near the flat skirt region.

The basic heater structure comprises a body block element 20, e.g., an aluminum casting, providing some capacity as a heat sink and water passage space through the walls of which heat from the engine exhaust pipe X is absorbed by the water; the element 20 having parallel longitudinal blind passages or bores 21, 22, the mouths of which at one flat end face are closed by a preferably matching end plate 23 sealed thereto by a suitable gasket 24, and secured by screws or bolts 25. The blind bores are connected by a slot 26 joining the passage mouths at the end face to define a water flow hollow or space in the heater, from one to the other of the connector fittings 27, 28 screwed into threaded apertures in the integral end wall of the casting to open to the passage ends.

The outer ends of the fittings 27, 28 afford here circumferentially ribbed nipples adapted to accept and hold thereon the ends of the elastomeric tubing used in the typical auto windshield washer system between supply container S and the inlet of pump P. Gasket 24 may be a simple soft fiber or resilient sheet material having the same section as the casting 20. Also the block 20 may as cast have apertures to be subsequently threaded for the bolts 25, and for fittings 27, 28, since these are not crucially located; especially where the bolt holes in 23 are made oversize. Similarly the passages 21, 22 and slot 26 rather than by drilling or other machining preferrably are simply formed as cast, as may be also easily be done to provide at least the nipple projections at the locations of inlet and outlet fittings 27, 28 for subsequent drilling.

Figure 3:
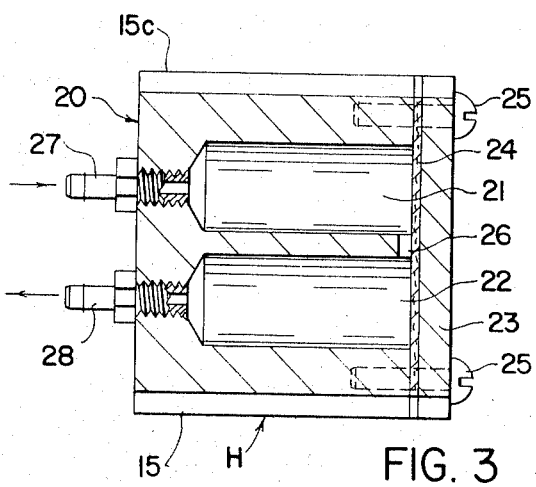
FIG. 3 is a horizontal section taken as indicated by the line 3—3 in FIG. 2.
Figure 4:
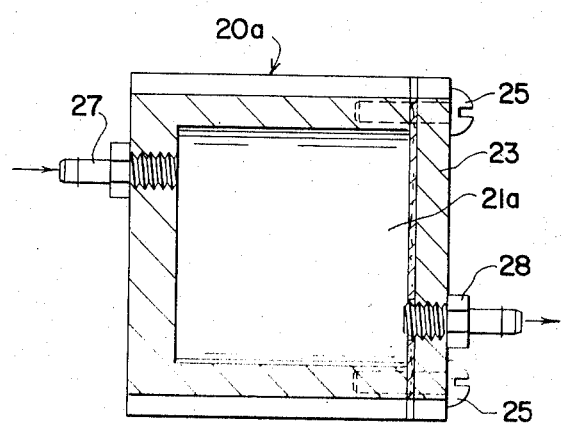
FIG. 4 is a section similar to FIG. 3 in a modification.

In place of the parallel passages 21, 22 providing the back and front passage of FIG. 2, in FIG. 4 a wide flat slot-like cavity 21a is formed in the body element 20a as cast, with one fitting 28 then preferably located in the end plate 23 in the region where it closes the slot end.

Where it is desired to make the block element with the longitudinal hollow formed therein as an extrusion, then in place of the integral end wall of the FIG. 3 or FIG. 4, for example, a second end plate would be used bolted and gasketed to the second end; as may also be done with either a casting or extrusion when more than two liquid passes are desired with a connecting slot at each end.

Plate 23 in either case may be a stamping punched out of sheet stock to the required outline and provided with the necessary holes for the bolts and in the case of FIG. 4 for the fitting 28.

The convexity of the recess 15a may amount to almost a full semi-cylinder, preferrably with slight straight and diverging wall portions for easier placement, also casting draft; and where pipe X has the same curvature a rather extended heater-to-pipe contact area is then obtained. However, even where the pipe radius is say smaller, so that theoretically a line contact would result, practically a more than line contact arises and with, moreover, the embracing of the pipe by the dependent struts, the proximity still offers further good heat transfer by radiation and air convection to the extent that one heater size may usefully be applied even to a range of pipes.

It is seen that a simple structure for a wash water heater unit is provided readily produced by low cost fabrication operations, basically one-piece, two-piece or at most three-piece in form, and well adapted for simple secure clamping, even by a wrap-around strap style clamp, though the body may be provided with points for clamp attachment.

It has been found that a heater unit of the structure appearing in FIG. 1 with elements 20 and 23 cast aluminum, weighing about 17 ounces, 2 ⅞ inches long, 2 ⅝ inches high, 3 ¼ inches wide, and with a bottom recess mouth span of 3 ⅛ inches, was suitable for the intended purposes on the exhaust pipes in a wide variety of current model compact and standard size automobiles.

I claim:

1. For heating a wash liquid, used in an automotive vehicle for windshield washing, by waste heat available at an internal combustion engine exhaust system having an exhaust gas conducting pipe, a liquid heater comprising : a cast metal body having
    a longitudinal transversely concave bottom recess for saddling a vehicle engine exhaust system pipe in thermally conductive contact,
    a transversely convex top merging downwardly into parallel longitudinal side skirts, laterally defining downwardly extended walls of said recess;
said body having therein a liquid conducting passageway with ends opening through the external surface of the body to provide inlet and outlet openings for said passageways; and a pair of external connector fittings assembled to respective said openings of said body providing wash liquid inlet and outlet line connections to said passageway, for connection of the heater to a source of wash liquid and for a connection discharging to windshield wash jets.

2. A heater as described in claim 1, wherein said body is a casting with said passageway provided by at least two parallel longitudinal cast-in passages laterally connected to each other at one end of said body by a joining passage, and said fittings are threaded into respective said openings.

3. A heater as described in claim 1, wherein
    said body is a casting with said passageway cast therein and provided by a plurality of longitudinally extending cast-in passages connected in series by a lateral cast-in joining passage at a respective end,
    said fittings being threaded into respective openings of the casting into ends of the cavities providing respective ends of the series.

4. A heater as described in claim 1, and
    means clamping said body saddled on a pipe conducting hot exhaust gases from the vehicle engine.

5. A heater as described in claim 1, comprising:
    said body as including a block element having a said longitudinal bottom recess, and an end plate element;
    said block element having a longitudinal hollow opening through at least one generally flat body end face at one end of the block element;
    said end plate bolted to said end face as a closure element for said hollow at said one end to define a liquid flow space, the body being closed at the other end; gasket means sealing said end plate to the body block element; and
    said pair of external connector fittings secured in the assembly of said elements to open to said hollow as said passageway.

* * * * *